Feb. 26, 1952 R. G. MELROSE 2,587,058
UNITARY PIVOT PIN OR BOLT
Filed July 20, 1949
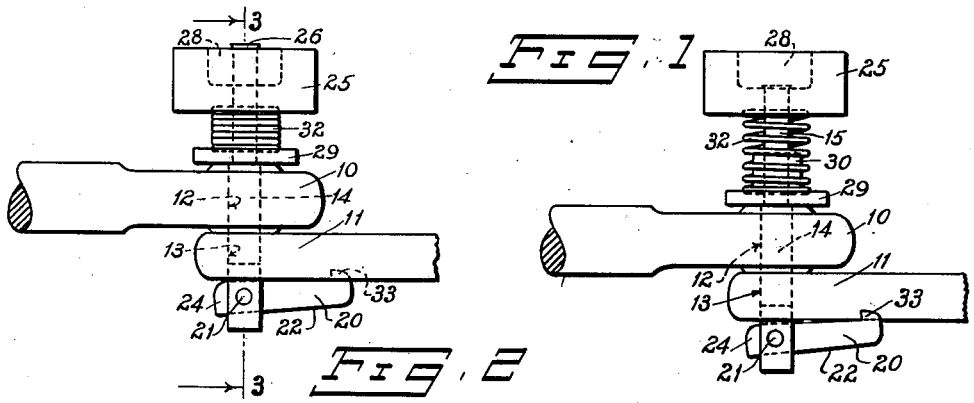
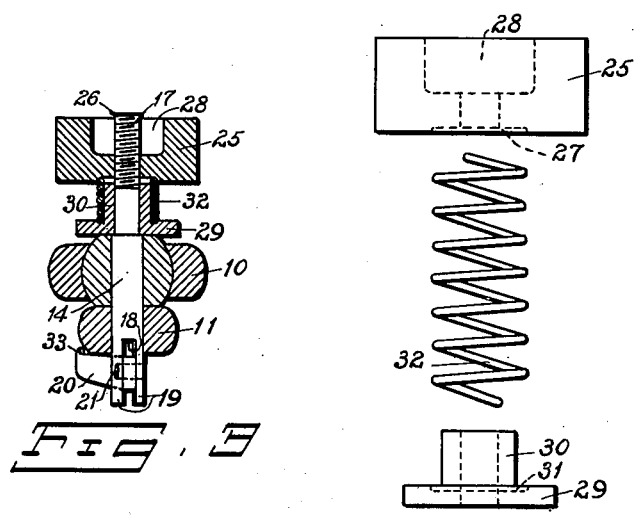
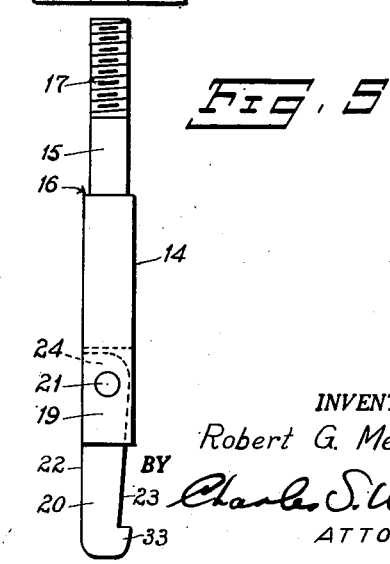
INVENTOR.
Robert G. Melrose
BY Charles S. Wilson
ATTORNEY.

Patented Feb. 26, 1952

2,587,058

UNITED STATES PATENT OFFICE 2,587,058

UNITARY PIVOT PIN OR BOLT

Robert G. Melrose, Lloyd Harbor, N. Y., assignor to Republic Aviation Corporation, Farmingdale, N. Y., a corporation of Delaware Application July 20, 1949, Serial No. 105,884

1 Claim. (Cl. 85—3)

This invention relates to pivot pins or bolts of the type disclosed in copending application of Warren R. Petersen, filed March 26, 1949, Serial No. 83,670 and proposes to improve a device of this character by incorporating in the unitary pin or bolt structure all elements necessary or essential to the operation, attachment and adjustment thereof.

Once a pivot pin or bolt, such as contemplated by the present invention, is in its operative position it may be adjusted to remove all play from a joint established by it and in this adjustment there is a tendency for the pin or bolt to rotate bodily unless this tendency is positively counteracted. It is proposed by the present invention to incorporate in the structure of the pivot pin or bolt means by which any rotary movement of the pin or bolt in the apertures of members connected by it is counteracted or arrested so that adjustment of the assembly may be accomplished without causing more than a slight initial rotation by pin or bolt.

With the above and other objects in view as will be apparent, this invention consists in the construction, combination and arrangement of parts all as hereinafter more fully described, claimed and illustrated in the accompanying drawings, wherein:

Fig. 1 is a side elevation of the present pin or bolt pivotally in its operative position securing the overlapped ends of a pair of links or levers one to the other, and illustrates the same prior to threading the nut of the assembly inwardly of its shank;

Fig. 2 is a similar view illustrating the nut of the assembly threaded home to tighten the joint established by the present pin or bolt;

Fig. 3 is a vertical section taken along line 3—3 of Fig. 2;

Fig. 4 is a perspective of the latch pivoted to a bifurcated end of the shank of the instant assembly; and Fig. 5 is an exploded view of the present pivot pin or bolt to illustrate the details of the several components thereof and the sequence in which they may be assembled.

The conventional bolt and nut requires that the bolt be held against rotation while the nut is threaded home on the bolt. While the pivot pin or bolt of the aforesaid copending application is a "quick-disconnect" it, like the conventional bolt and nut, requires that its shank or pin be held against rotation during the movement of the nut relative to and along said pin or shank. In that form of the device disclosed in said copending application this is accomplished by modifying one of the members connected by the pin or bolt to the extent of embodying therein or thereon a stop to contact the latch when positioned angularly with respect to the shank and thereby arrest any rotary movement of the shank occasioned by the nut being adjusted thereon.

The present invention proposes to create an entirely self-contained and unitary device by eliminating all modification of the attached or connected members, and by incorporating means to prevent rotary movement by the shank in a unitary pivot pin or bolt assembly.

Reference being had more particularly to the drawings 10 designates a link or lever which is to be pivotally attached to a second link or lever 11 by the unitary pivot pin or bolt assembly forming the subject matter of the present invention. The end portions of these levers or links 10 and 11 may be flattened and are respectively provided with the transverse apertures 12 and 13 to be registered one with the other for the reception, and projection therethrough, of the shank 14 of the present pivot pin or bolt assembly for the pivotal interconnection of these levers or links.

The shank 14 has one of its end portions 15 reduced in diameter to create the shoulder 16 at its inner end and this reduced portion 15 is provided with the threads 17 extending inwardly from the outer end of said reduced portion. At its opposite end the shank 14 is longitudinally and centrally bifurcated, as at 18, to create the spaced, substantially parallel arms 19 between which a latch 20 is pivoted medially of its length on a pin 21 traversing the bifurcation 18 and secured to the arms 19.

The instant invention particularly resides in the construction, form and operation of this latch 20 as well as in its cooperation with the shank 14 and one of the connected members 10 or 11. At no point in its length is the latch 20 of greater width than the width or overall diameter of the shank 14 to the end that, when it is coextensive with the shank, it will readily pass through any opening or openings through which the shank can pass. One longitudinal edge 22 of the latch 20 is substantially straight and so arranged that when the latch is positioned coextensive with the shank 14, as hereinafter described, it will rest parallel to the longitudinal edges of the arms 19 of the bifurcated end of the shank and to the longitudinal axis of the shank and form a continuation of the surface of the shank. The opposite longitudinal edge 23 of the latch 20 is also straight throughout the major portion of its length, but slopes inwardly of the latch toward the edge 22 from a point adjoining its inner end to a point adjoining its outer end. At its inner transverse extremity 24 the latch is formed on a curve extending from the inner end of the edge 22 to the inner end of the opposite or sloping edge 23. It is to be noted that the ends of the edges 22 and 23 are not oppositely disposed transversely of the inner end of the latch but, on the contrary, the end of the edge 23 is positioned inwardly of the length of the latch from the end of the edge 22. By this means the edge 22 of the latch is somewhat larger than the edge 23 and is connected to the latter by the curved, transverse end 24. By this construction of the inner end 24 of the latch 20 that part thereof adjacent the end of the edge 22 will contact the bottom of the bifurcation 18 in the shank 14 when the latch is aligned longitudinally with the shank and arrest and prevent any further the pivotal movement of the latch 20 relative to the shank 14. The curved remainder of the end 24 of the latch 20 permits the pivotal movement of the latch from a position in longitudinal alignment with the shank 14 in one direction only whereby the latch may be moved in that direction through approximately 90° to a position substantially at right angles to the longitudinal axis of the shank. In other words the latch 20 may swing between the angular position shown in Figs. 1 to 3 inc. and the position shown in Fig. 5 where it is in longitudinal alignment with the shank. This movement is arrested in one direction by contact between the bottom of the bifurcation 18 in the shank 14 and the inner end of the latch in alignment with the edge 22 and in the opposite direction between the sloping edge 23 and the surface of an adjacent connected member such as link 11.

A cup nut 25 coacts with the threads 17 of the reduced end portion 15 of the shank 14 and externally of this nut 25 the extremity of the shank is upset or headed, as at 26, so that when the nut is once in its operative position coacting with the threads 17 it cannot be removed from reduced portion 15 of the shank 14. The inner face of the nut 25 is provided with a shallow recess 27 concentric to the opening through the nut and its outer face is provided with a relatively deep cavity or cup 28 in which the extremity of the reduced portion 15 of the shank operates as shown in Fig. 3.

A washer 29, having a cylindrical and concentric spacer 30, is loosely mounted on the reduced end portion 15 of the shank 14 inwardly of the nut 25 to normally bear against the shoulder 16 thereof. The base of the spacer 30 is surrounded by a recess 31 formed in the face of the washer 29 adjacent the base of the spacer 30.

Interposed between the inner faces of the nut 25 and washer 29 is a coil spring 32, surrounding the reduced portion 15 of the shank 14. One end of this spring 32 is seated in the shallow cavity 27 in the inner face of the nut, while its opposite end is seated in the similar cavity 31 in the washer 29. Since the spring 32 is an extension spring and abuts the nut 25 at one end and the washer 29 at its other end, it normally and resiliently maintains the washer 29 seated on the shoulder 16 of the shank regardless of the position of the nut. Manifestly, as the nut is threaded inwardly of the reduced portion 15 of the shank 14 the tension of the spring 32 increases until the spring is fully compressed.

From the foregoing it will be apparent that as the nut 25 is rotated on the end portion 15 of the shank there will be a constant tendency by the shank 14 to rotate in unison with the nut within the openings 12 and 13 of the members 10 and 11 pivotally connected by the shank 14. This tendency is of course increased by the pressure of the spring 32 between the nut 25 and washer 29. Thus once the shank 14 has been projected through the openings 12 and 13 and the latch 20 is positioned substantially at right angles thereto, the rotation of the nut 25 may cause a free rotation of the shank 14 in unison with the nut and with it the angularly disposed latch 20 unless some means is provided to arrest this rotary movement. If and when the rotary movement of the shank is arrested or eliminated the nut 25 can be rotated relative to and adjusted on the shank. Accordingly the present invention proposes means embodied in the latch 20 which will contact with a part or surface of the adjacent lever or link to arrest any rotary movement on the part of the shank 14. At the same time this means, incorporated in the latch, is so proportioned and arranged that it will not interfere with the insertion in and the projection of the latch 20 through the openings 12 and 13 when said latch is in longitudinal alignment with the shank 14. To that end the edge 23 of the latch 20, which slopes inwardly from the end 24 of the latch toward the opposite edge 22 of the latch, is terminated at a point inwardly of the outer extremity of said latch. Since the latch 20 originally has a uniform width throughout its length the angular disposition of the edge 23 relative to the edge 22 and the termination thereof inwardly of the outer end of the latch results in a laterally extending ear 33 at the outer extremity of the latch 20.

When the latch 20 is positioned as shown in Figs. 1 and 2, viz., substantially at right angles to the shank 14, the sloping edge 23 thereof may rest flush against the outer surface of the adjoining lever or link 11, with the result that the latch is not located exactly at right angles to the shank 14 but is positioned a little above this angle. When the latch 20 is so arranged the ear 33 thereof projects beyond the plane of the outer surface of the link or lever 11 whereby the rotation of the latch 20 in unison with the shank 14, in either direction, under the impetus of the nut 25 causes the ear 33 to abut one edge or the other of the member 11 and thereby arrest any further rotary movement of the shank 14. Once the ear 33 has contacted the edge of the member 11 the nut 25 may be freely rotated and adjusted relative to the shank 14.

As the overall width of the latch 20 does not exceed at any point the diameter or greatest width of the shank 14 it may, when positioned coextensive with the shank 14 with its edge 22 aligned with the surface of the shank 14, readily pass through the apertures 12 and 13 of the connected members 10 and 11. When disposed in this position that portion of the end 24 of the latch 20 normal to the edge 22 thereof will abut the base of the bifurcation 18 and arrest the movement of the latch 20 in one direction while the curved portion of the end 24 which connects with the edge 23 of the latch permits the latch to swing in the opposite direction. The action of the spring 32 between the washer 29 and the nut 25 insures constant contact between the sloping edge 23 of the latch 20 and the adjoining surfaces of the member 11 with the end 24 of the latch 20 disposed on one side of the pivot 21 and the remainder of the latch positioned on the opposite side thereof.

The foregoing makes it evident that when the washer 29, spring 32 and the nut 25 are assembled on the reduced portion 15 of the shank 14 and the extremity thereof headed or upset, as at 26, these elements, for all practical purposes, become integral but adjustable parts of the shank. If the spring 32 is manually compressed between the nut 25 and the washer 29 and the latch 20 is disposed in alignment with the shank 14, the latch and shank may be projected through the openings 12 and 13 until the entire length of the latch is free of these openings whereupon it may be moved on its pivot 21 to an angular position relative to the shank. With the latch 20 and shank 14 inserted in and projected through the openings 12 and 13 of the members 10 and 11 and the latch angularly disposed relative to the shank, the washer 29 of the assembly may be released to bear not only on the shoulder 16 of the shank 14 but also against the end portion of the adjoining member 10. The expanding action of the spring 32 between the washer 29 and the nut 25 will then bring the sloping edge 23 of the latch 20 into bearing contact with the outer surface of the member 11. The nut 25 may be then threaded inwardly or outwardly of the shank portion 15 until the spring 32 is either fully compressed to produce a tight joint or pivot, or relaxed to permit the removal of the shank if and when the latch is again aligned with the shank. If this threaded movement of the nut 25 causes any rotation of the shank 14 in the openings 12 and 13 this rotary movement is limited by contact between the ear 33 of the latch and an edge of the member 11 to something less than 360°. In this manner any tendency on the shank 14 to be rotated, in either direction, by the nut 25 is limited to an initial rotation continuing only until the ear 33 contacts one edge or the other of the adjoining link or lever 11.

The latch 20 may be of any suitable and desirable length but its minimum length will be determined by the width of the adjoining connected member, it being necessary that the latch have a length at least equal to, and preferably greater than, the width of the adjacent member. Thus if the member 11 is relatively wide the length of the latch 20 should be correspondingly increased. In fact the length of the latch may be increased to insure cooperation with substantially any type and width of member 11.

What is claimed is:

A pivot pin or bolt comprising a shank bifurcated at one end and threaded at its opposite end, a nut adjustable on the threaded end of the shank to be located either in an inoperative position whereupon joined members have limited relative lateral movement or in an operative position whereupon said joined members are totally prevented relative lateral movement, a latch pivoted adjacent one of its ends within the bifurcated end of the shank, and means on that end of the latch disposed within the bifurcation to engage the bifurcated end of the latch to permit the latch to swing in one direction only to occupy an angular position relative to the shank, and a single lateral ear on the outer end portion of one longitudinal side and disposed in the plane of the latch to project in the direction in which the latch must move to assume its position angular to the shank, said one longitudinal side extending in a straight line from said ear to beyond the pivot of said latch and adapted to engage the surface of the adjacent member on opposite sides of the pivot of the latch, the maximum width of the latch being no greater than the greatest transverse dimension of the shank.

ROBERT G. MELROSE.

REFERENCES CITED

The following references are of record in the file of this patent:

UNITED STATES PATENTS

| Number | Name | Date |
|---|---|---|
| 1,077,006 | Smith | Oct. 28, 1913 |
| 1,168,257 | Kennedy | Jan. 11, 1916 |
| 1,386,202 | Peterson | Aug. 2, 1921 |
| 1,409,626 | Walter | Mar. 14, 1922 |
| 1,818,161 | Ratigan | Aug. 11, 1931 |
| 2,318,548 | Whitehead | May 4, 1943 |
| 2,360,395 | Byron | Oct. 17, 1944 |
| 2,446,030 | Tunnard-Moore | July 26, 1948 |
| 2,484,458 | Modrey | Oct. 11, 1949 |